United States Patent [19]

Yoshino et al.

[11] Patent Number: 5,167,970
[45] Date of Patent: Dec. 1, 1992

[54] APPARATUS FOR PREPARATION OF SYNTHETIC RESIN VESSEL HAVING A HANDLE

[75] Inventors: Minoru Yoshino, Ogawa; Yosuke Yasuda, Tokyo; Nobuhiro Kishida; Masaki Miura, both of Kawasaki; Akihito Morimura, Tokyo, all of Japan

[73] Assignee: Toyo Seikan Kaisha, Ltd., Tokyo, Japan

[21] Appl. No.: 649,520

[22] Filed: Feb. 1, 1991

[30] Foreign Application Priority Data

Jun. 4, 1990 [JP] Japan ................. 2-145863

[51] Int. Cl.⁵ ........................................ B29C 49/20
[52] U.S. Cl. ............................ 425/525; 215/1 C; 215/100 A; 264/516; 264/537; 425/533
[58] Field of Search ............... 425/525, 503, 504, 533, 425/522; 264/516, 537; 215/1 C, 100 A

[56] References Cited

U.S. PATENT DOCUMENTS

| | | | |
|---|---|---|---|
| 3,892,513 | 7/1975 | Mehnert et al. | 425/525 |
| 3,983,199 | 9/1976 | Uhlig | 425/525 X |
| 4,604,044 | 8/1986 | Hafele | 425/525 |
| 4,909,978 | 3/1990 | Hasegawa et al. | 425/525 X |

FOREIGN PATENT DOCUMENTS

| | | |
|---|---|---|
| 56-64948 | 6/1981 | Japan . |
| 56-64949 | 6/1981 | Japan . |
| 56-74438 | 6/1981 | Japan . |
| 62-182044 | 8/1987 | Japan . |
| 2-32950 | 2/1990 | Japan . |

Primary Examiner—Richard L. Chiesa
Attorney, Agent, or Firm—Sughrue, Mion, Zinn, Macpeak & Seas

[57] ABSTRACT

An apparatus for the preparation of a vessel having a handle, which includes an injection mold having a cavity for forming a handle having an endless holding portion and an endless attachment portion; an injection molding mechanism for injecting a resin for the handle into the cavity of the injection mold; a blow-forming or draw-blow-forming split mold having a parting surface that can be closed, cavity assembly which is arranged in the split mold plane-symmetrically with the parting surface and includes an inserting cavity for containing the handle therein, and a forming cavity which has a neck-forming cavity, a barrel-forming cavity, a closed bottom-forming cavity, a recess-forming cavity formed at a part of the barrel-forming cavity so that the diameter of a deepest part of the recess-forming cavity is substantially equal to or slightly larger than the diameter of the neck-forming cavity, a projection-forming cavity for forming a projection to project and extend through the attachment portion almost to the center of the recess-forming cavity, and a flange-forming cavity formed on the top end of the projection-forming cavity to have a section expanded over the projection-forming cavity; a mechanism for supplying a blowing pressure into a preform held by the split mold to effect blow-forming or draw-blow-forming of the preform; a pushing pin that can be pressed into the flange-forming cavity; and a pushing pin-driving mechanism.

1 Claim, 19 Drawing Sheets

FIG.7
FIG.8
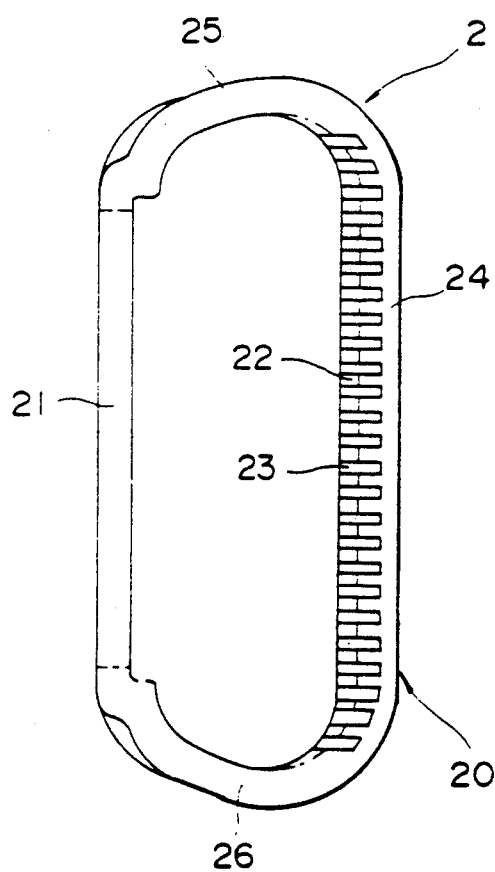
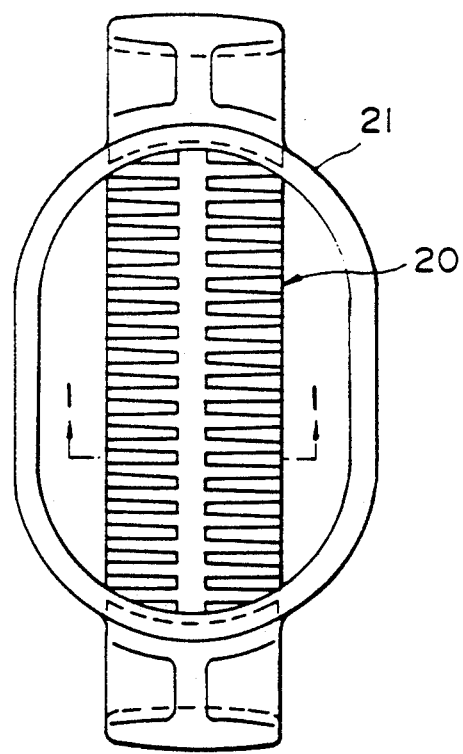
FIG.9
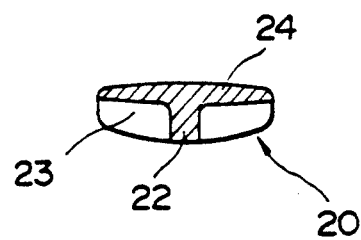

(A)

(B)

(C)

APPARATUS FOR PREPARATION OF SYNTHETIC RESIN VESSEL HAVING A HANDLE

BACKGROUND OF THE INVENTION (1) Field of the Invention

The present invention relates to a process and apparatus for the preparation of a synthetic resin vessel having a handle. More particularly, the persent invention relates to a process and apparatus for preparing a synthetic resin vessel having a handle, comprising a vessel proper prepared by blow-forming or draw-blow-forming of a synthetic resin and a handle prepared independently from the vessel proper but secured to the vessel proper, at a high productivity without any loss time.

(2) Description of the Related Art

A plastic hollow vessel has a light weight and an excellent impact resistance. Accordingly, this vessel is widely used as a container for various liquids. Especially, a hollow vessel obtained by blow-draw-forming of polyethylene terephthalate (hereinafter referred to as "PET") has a high transparency, a good gas-barrier property, a light weight, an excellent impact resistance and an appropriate rigidity in combination, and this vessel is widely used as a packaging container for storing a liquid content therein.

In the case of a draw-blow-formed vessel of this type having a large size, in order to facilitate handling, it is desired to attach a handle to the vessel proper. From the principle of the blow-draw-forming process, it is difficult to form a handle integrally with the vessel by draw-blow-forming. Therefore, several proposals have been made on the method of attaching a handle to a draw-blow-formed vessel.

For example, there have been proposed a process in which a handle is formed in advance, the handle is placed in a blow mold, and a vessel-forming preform is draw-blown to prepare a draw-blow-formed vessel having a handle integrated therewith (see Japanese Unexamined Patent Publication No. 56-64948, Japanese Unexamined Patent Publication No. 56-64949 and Japanese Unexamined Patent Publication No. 56-74438), and a process in which a vessel having a handle is prepared by arranging in a rotary a station for forming a vessel parison by an injection unit, a station for draw-blow-forming the parison, a station for arranging an injection mold around the formed vessel, applying a pressure to the interior of the vessel and injection-forming a handle by another injection unit and a station for withdrawing the formed vessel having a handle (see Japanese Unexamined Patent Publication No. 62-182044).

In the case where a handle is formed on a vessel, there is ordinarily adopted a method in which a plurlaity of circumferential grooves are formed around the circumference of the vessel, and a handle is constructed by a plurality of band portions surrounding the circumferential grooves closely thereto and a handle portion formed integrally with the band portions. However, the presence of such band portions is not preferable in view of the appearance characteristics of the vessel. Moreover, molding defects such as burrs and weld marks are readily formed when the band portions are formed around the vessel by injection molding. This method is still insufficient in the effect of fixing the handle to the vessel assuredly and tightly.

SUMMARY OF THE INVENTION

It is therefore a primary object of the present invention to provide a process and a apparatus for preparing a synthetic resin vessel having a handle, in which the handle is fixed to the vessel proper assuredly and tightly without using the above-mentioned bands and which has excellent appearance characteristics.

Another object of the present invention is to provide a process and apparatus for the preparation of a synthetic resin having a handle by the so-called insert forming operation of carrying out the preparation by inserting a handle in a blow-forming split mold, in which the insertion of the handle into the blow-forming mold can be easily accomplished and the operation of supplying and inserting the handle can be performed at a high efficiency without any loss time.

In accordance with one aspect of the present invention, there is provided a process for the preparation of a synthetic resin vessel having a handle, which comprises the steps of:

forming a handle having an endless holding poriton and an annular attachment portion by injection molding of a synthetic resin;

inserting the handle into a blow mold and placing a parison of a synthetic resin in the blow mold, and blow-forming or draw-blow-forming a vessel proper having a neck, a barrel and a closed bottom, a recess having a deepest part having a diameter substantially equal to or slightly larger than the diameter of the neck, which is formed at a part of the barrel, and a projection formed substantially at the center of the recess for insertion of said annular attachment portion; and preferably, pressing said projection by a pushing pin while the blow-forming pressure is left in the vessel proper, whereby a flange is formed on the top end of the projection (first process).

In accordance with another aspect of the present invention, there is provided a process for the preparation of a synthetic resin vessel having a handle, which comprises steps of:

placing a parison of a synthetic resin in a blow mold and blow-forming or draw-blow-forming the parison into a vessel proper having a neck, a barrel and a closed bottom, a recess having a deepest part having a diameter substantially equal to or slightly larger than the diameter of the neck, which is formed at a part of the barrel, and a projection formed on the recess;

preferably, pressing said projection by a pushing pin while the blow-forming pressure is left in the vessel proper, whereby a flange is formed on the top end of said projection;

and inserting the flange-formed vessel proper into an injection mold and injecting a synthetic resin into the injection mold to form a handle having an endless holding portion and an annular attachment portion which forms a ring surrounding the projection between the flange and the recess (second process).

In accordance with still another aspect of the present invention, there is provided a process for the preparation of a synthetic resin having a handle, comprising a vessel proper prepared by blow-form or draw-blow-forming of a synthetic resin and a handle formed separately from the vessel proper by secured to the vessel proper, said process comprising rotationally supplying the handle to a blow-forming split mold by a holding member before the blow-forming, and supplying the handle to the holding member turning reversely outwardly of the blow-forming split mold and in the vicinity thereof during the blow-forming and keeping the handle on standby. More specifically, this process comprises arranging a split mold having a parting surface that can be closed and having a handle-inserting cavity and a vessel proper-forming cavity, which are formed plane-symmetrically to the parting surface, and a handle-holding member for holding the handle and inserting the handle into the handle-inserting cavity, rotating the handle-holding member in the state where the split mold is opened and inserting the handle-holding member into the handle-inserting cavity of one split mold part, supplying a parison for blow-forming or draw-blow-forming into the vessel proper-forming cavity of the split mold, closing the split mold, carrying out blow-forming or draw-forming of the parison and simultaneously, securing the handle to the vessel being formed, turning the handle-holding member reversely outwardly of the blow-forming split mold and in the vicinity thereof in the state where the split mold is closed, to supply the handle to the handle-holding member and keep the handle on standby, and opening the split mold and withdrawing the formed synthetic resin vessel having the handle secured thereto (third process).

In accordance with still another aspect of the present invention, there is provided an apparatus for the preparation of a vessel having a handle, which compirses:

an injection mold having a cavity for forming a handle having an endless holding portion and an endless attachment portion;

an injection molding mechanism for injecting a resin for the handle into the cavity of the injection mold;

a blow-forming or draw-blow-forming split mold having a parting surface that can be closed, a cavity assembly which is arranged in the split mold plane-symmetrically with the parting surface and includes an inserting cavity for containing the handle therein, and a forming cavity which has a neck-forming cavity, a barrel-forming cavity, a closed bottom-forming cavity, a recess-forming cavity formed at a part of the barrel-forming cavity so that the diameter of a deepest part of the recess-forming cavity is substantially equal to or slightly larger than the diameter of the neck-forming cavity, a projecting-forming cavity formed to project and extend through the attachment portion almost to the center of the recess-forming cavity, and a flange-forming cavity formed on the top end of the projection-forming cavity to have a section expanded over the projection-forming cavity;

a mechanism for supplying a blowing pressure into a preform held by the split mold to effect blow-forming or draw-blow-forming of the preform;

a pushing pin that can be pressed into the flange-forming cavity; and a pushing pin-driving mechanism for pressing the pushing pin in the state where the blowing pressure is still applied to a hollow member formed in the split mold, whereby a flange is formed on the top end of the projection (first apparatus).

In accordance with still another aspect of the present invention, there is provided an apparatus for the preparation of a vessel having a handle, which comprises:

a blow-forming or draw-blow-forming split mold having a parting surface that can be closed;

a forming cavity arranged in the split mold plane-symmetrically with the parting surface, which has a neck-forming cavity a barrel-forming cavity, a closed bottom-forming cavity, a recess-forming cavity formed at a part of the barrel-forming cavity so that the diameter of a deepest part of the recess-forming cavity is substantially equal to or slightly larger than the diameter of the neck-forming cavity, a projection-forming cavity formed to project and extend through the attachment portion almost to the center of the recess-forming cavity, and a flange-forming cavity formed on the top end of the projection-forming cavity to have a section expanded over the projection-forming cavity;

a mechanism for supplying a blowing pressure into a preform held by the split mold to effect blow-forming or draw-blow-forming of the preform;

a pushing pin that can be pressed into the flange-forming cavity;

a pushing pin-driving mechanism for pressing the pushing pin in the state where the blowing pressure is still applied to a hollow member formed in the split mold, whereby a flange is formed on the top end of the projection;

an injection mold having a vessel proper cavity for containing a flanged vessel proper formed in the split mold and a cavity for forming a handle having an endless holding portion and an attachment portion, the attachment portion-forming cavity being arranged to form a ring surrounding the projection between the flange and the recess; and injection mechanism for injecting a resin for the handle in the cavities of the injection mold (second apparatus).

In accordance with still another aspect of the present invention, there is provided an apparatus for the preparation of a synthetic resin having a handle, comprising a vessel proper prepared by blow-forming or draw-blow-forming of a synthetic resin and a handle formed separately from the vessel proper but secured to the vessel proper, said apparatus comprising a split mold having a parting surface that can be closed and having a handle-inserting cavity and a vessel proper-forming cavity, which are formed plane-symmetrically to the parting surface; a handle-holding member having a handle-holding portion, and opening-closing mechanism for opening and closing the handle-holding portion and a rotary driving mechanism for rotating the handle-holding portion; a rotary member having a pluraliy of pairs of said split molds and handle-holding members arranged circumferentially thereon; a parison supply zone, a handle supply zone and a handle-secured synthetic resin vessel discharge zone, which are arranged around the rotary member; a parison supply mechanism arranged in the parison supply zone; a handle supply mechanism arranged in the handle supply zone, a vessel discharge mechanism arranged in the handle-secured synthetic resin vessel discharge zone; a split mold opening and closing mechanism for closing the split mold after it has passed through the parison supply zone and opening the split mold before it arrives at the handle-secured synthetic resin vessel discharge zone; a control mechanism for controlling the opening-closing mechanism and rotary driving mechanism so that the handle-holding portion is rotated to insert the handle into the hold-inserting cavity of one split mold part in the state where the split mold is opened, the handle-holding member is then opened to discharge the handle, the handle-holding portion is turned reversely to a handle-receiving position located outwardly of the split mold and in the vicinity thereof before the handle-holding portion arrives at the handle supply zone and the handle-holding portion is closed to hold the handle after the handle-holding portion has received the handle from the handle supply mechanism; and a forming mechanism for blowing a fluid into the parison while the split mold is closed, to effect blow-forming or draw-blow-forming of the parison into a vessel and secure the handle to the vessel being formed (third apparatus).

BRIEF DESCRIPTION OF THE DRAWINGS

FIG. 7 is a side view illustrating only the handle shown in FIG. 2.

FIG. 8 is a side view showing the handle of FIG. 7 in the state rotated by 270°.

FIG. 9 is a view showing the section taken along line A—A in FIG. 8.

DETAILED DESCRIPTION OF THE PREFERRED EMBODIMENTS

Figure 1:
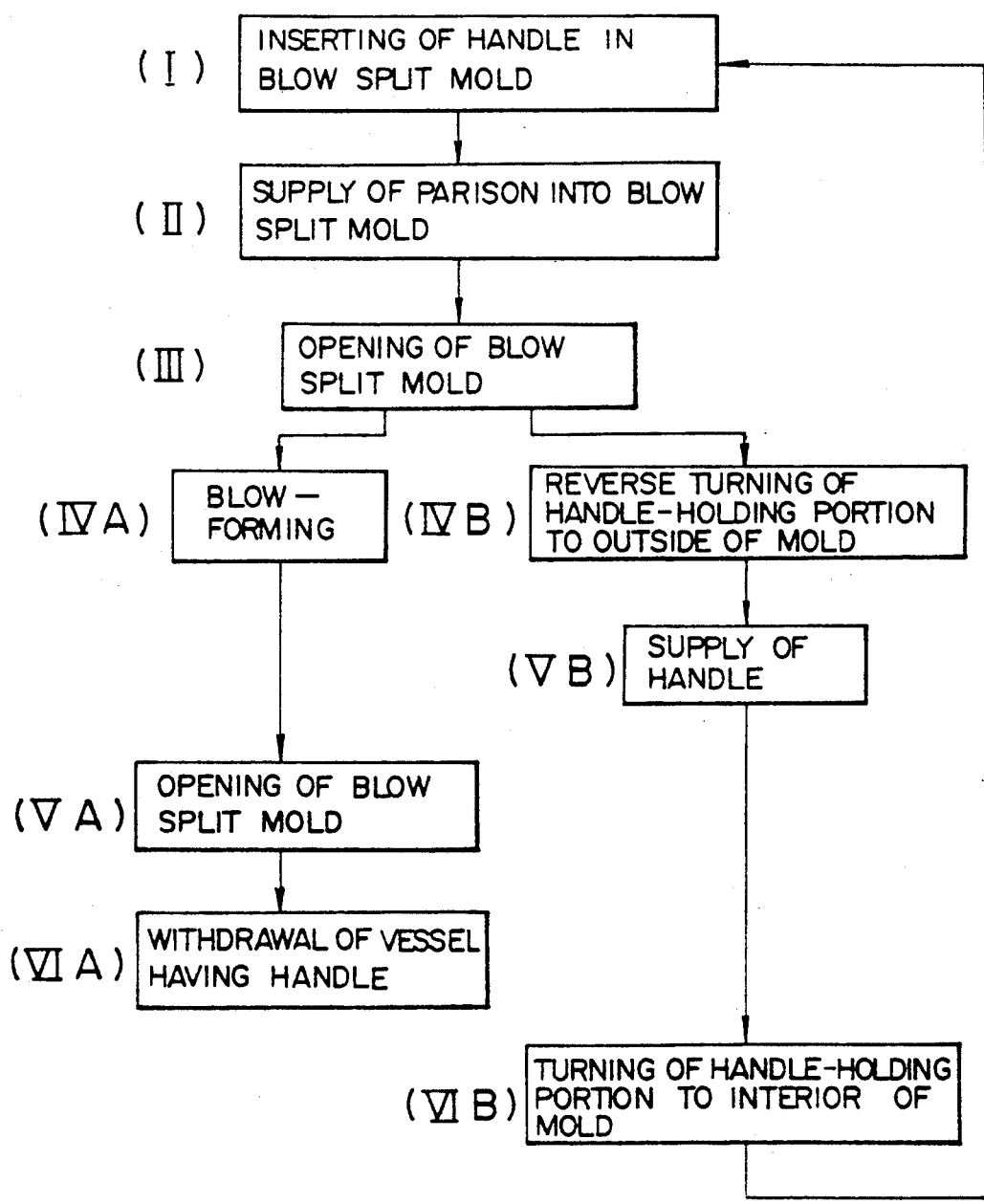
FIG. 1 is a process diagram illustrating the operations of the present invention.

The vessel proper prepared according to the process and apparatus of the present invention is in agreement with the conventional vessel proper in that the vessel proper comprises a neck, a barrel and a closed bottom, which are integrally prepared by blow-forming or draw-blow-forming of a synthetic resin. However, the vessel of the present invention is characteristic over the conventional vessel in various points. The first characteristic feature of the vessel of the present invention is that a recess is formed at a part of the barrel so that the diameter of the deepest part of the recess has a diameter substantially equal to or slightly larger than the diameter of the neck, a projection is formed substantially at the center of this recess, both of the holding portion and the attachment portion are endless, and the attachment portion has an annular shape similar to the annular shape of the projection of the vessel proper.

According to the first and second processes of the present invention, the vessel proper having the above-mentioned structure is integrally combined with the handle at the step of blow-forming or draw-blow-forming of the vessel proper or the step of injection molding of the handle, and by inserting the projection of the vessel proper into the ring of the annular attachment portion and expanding the top end of this projection outwardly to form a flange, the handle is secured and fixed to the vessel proper.

Namely, since a recess is formed on the barrel so that the diameter of the deepest part of the recess is substantially equal to or slightly larger than the diameter of the neck and a projection is formed substantially at the center of this recess, a blow-forming or draw-blow-forming of a parison, the thickness of the recess and projection are kept larger than those of other portions of the barrel wall because the recess and projection are located closely to the parison wall. Therefore, there is produced a tough structure in which the handle-attaching projection and the recess supporting this projection are hardly deformed. Furthermore, by inserting this projection into the ring of the attachment portion of the handle and expanding the top end of the projection outwardly to form a flange, the handle is tightly fixed and falling of the handle can be prevented. Still further, if the projection is formed to have a non-circular section, relative rotation is not caused between the handle and the vessel proper and tight fixation can be attained. Especially, when a concave face is formed on the top end of the projection, large outward expansion of the projection in the form of a flange is attained, and prevention of falling of the handle and fixation of the handle can be accomplished more assuredly.

Moreover, since the handle having a holding portion and an attachment portion, each of which has an endless and annular shape, the strength of the handle can be increased with a relatively small amount of a resin, and the appearance of the vessel is not degraded by the handle and the commercial value of the vessel can be increased.

In the vessel prepared according to the present invention, since the attachment portion of the handle is located on the central side of the vessel, that is, at a position closer to the center of gravity, when the handle is gripped even in the state where the vessel is filled with a liquid content, the moment imposed on the attachment portion or holding portion is small and the vessel is easy to handle, and no large force is necessary for gripping. Still further, since the handle is formed in the recess of the vessel and the holding portion has an endless annular shape, the hand can be easily inserted.

Moreover, since the holding portion of the handle is formed on the same plane as the outermost surface of the barrel of the vessel or on a plane below the outermost surface of the barrel, the vessel can be contained compactly in a case, and the space for storage or transportation can be reduced.

According to the third process of the present invention, the operation of the above-mentioned first process is performed more efficiently. More specifically, a blow-forming split mold having a handle-inserting cavity and a vessel proper-forming cavity is used, and a handle formed separately in advance is inserted into the handle-inserting cavity, a parison is supplied into the vessel proper-forming cavity and blow-forming or draw-blow-forming of the parison is carried out, as in the conventional technique. However, the present invention is prominently characterized in that instead of the operation of inserting the handle directly in the handle-inserting cavity by a turnable and reversely turnable handle-holding member attached to each blow-forming split mold, there are adopted two operations, that is, the operation of supplying the handle into the handle-inserting cavity by this handle-holding member and the operation of supplying the handle to the handle-holding member turning reversely outwardly of the blow-forming split mold and in the vicinity thereof during the blow-forming and keeping the handle on standby at this position.

Referring to FIG. 1 illustrating steps of the third process, at step (1), the handle is in the state inserted in the blow-forming split mold and at next step (2), a parison is supplied into the blow-forming mold and at step (3), the blow-forming mold is closed. A turnable and reversely turnable handle-holding member is arranged in this blow-forming split mold, and the blow-forming operation and the operation of supplying the handle to the handle-holding member are carried out in parallel. More specifically, as shown in the step diagram of FIG. 1, in the blow-forming split mold, blow-forming by blowing a fluid into the parison or blow-draw-forming by stretch-drawing the parison in the axial direction and blowing a fluid into the parison, and fixation of the handle to the vessel, are carried out. At step 5(A), the blow-forming split mold is opened and at step 6(A), the handle-secured vessel is taken out from the mold.

During this blow-forming, the handle-holding member is reversely turned outwardly of the split mold and in the vicinity thereof. At step (5B), the handle-holding member receives the supplied handle and is kept on standby while holding the handle thereon. After the split mold is opened and the handle-secured vessel is taken out from the mold, at step (6B), the handle-holding member is turned toward the split mold to supply the handle into the split mold. Then, the above operations are similarly repeated.

In the third process of the present invention, since the handle is supplied into the split mold by rotation of the holding member, the supply of the handle can be accomplished assuredly at a high precision in a short time. Furthermore, since the holding member is reversely turned to receive the supplied handle and is kept on standby while the split mold is closed and the blow-forming is carried out, the preparation of a vessel having a handle can be performed smoothly without any time loss. According to the third process of the present invention, since insertion of the handle is performed in the tangential direction by rotation of the handle-holding member, even if the flange-forming mechanism is arranged in the split mold, the inserting operation is not disturbed by the flange-forming mechanism and hence, the inserting operation can be performed smoothly and the first process of the present invention can be worked efficiently.

Figure 2:
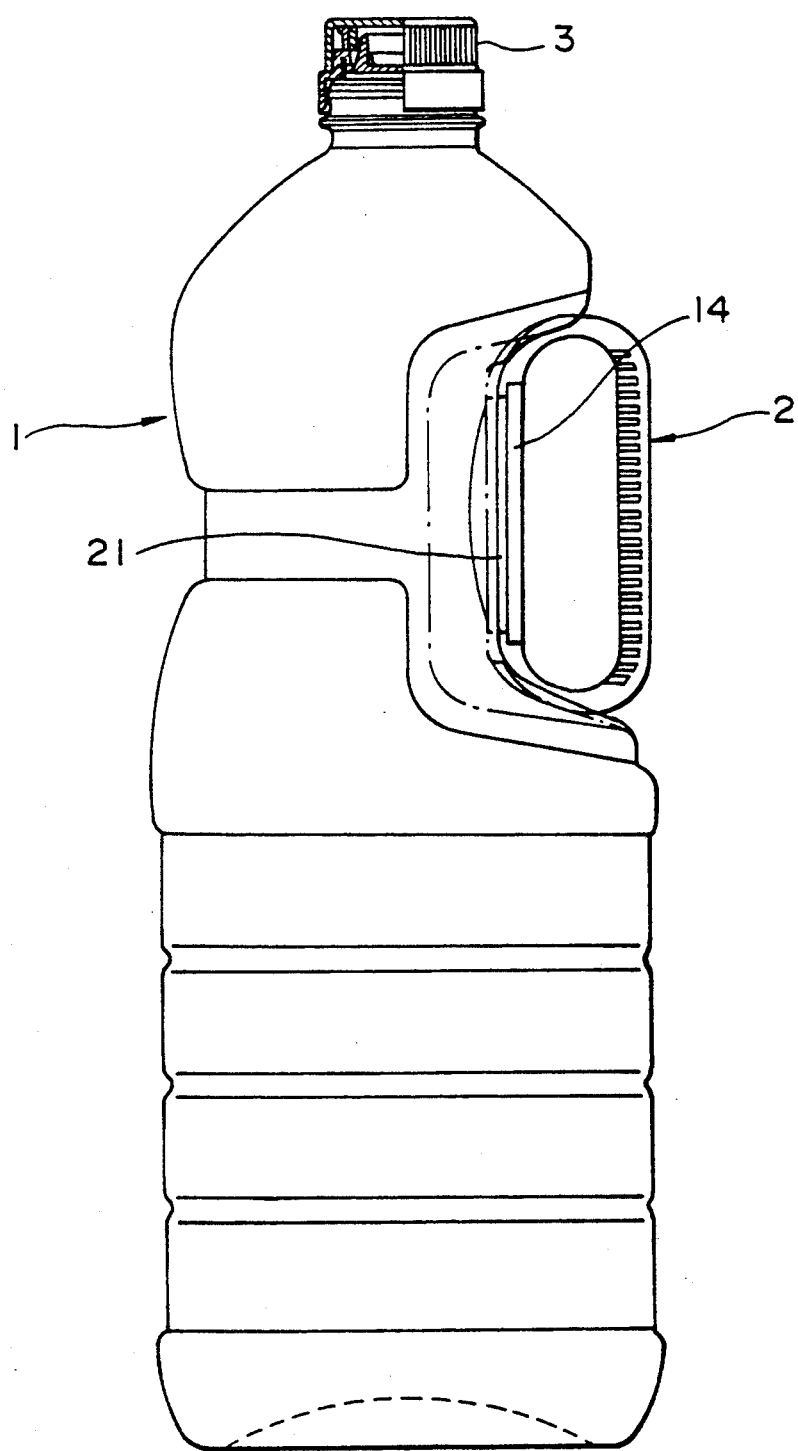
FIG. 2 is a side view showing a synthetic resin vessel having a handle according to the present invention.

Referring to FIG. 2 illustrating an embodiment of the synthetic resin vessel having a handle according to the present invention, this vessel comprises a vessel proper represented as a whole by reference numeral 1 and a handle represented as a whole by reference numeral 2, and a cap 3 is attached to the vessel proper 1.

Referring to FIGS. 3 through 6, the vessel proper 1 comprises a neck 4, a cylindrical barrel 5 and a closed bottom 6, and a conical shoulder 7 is present between the neck 4 and the barrel 5. A recess 8 is formed below this conical shoulder 7. This recess 8 comprises a top face 9 extending slightly slantingly to the center of the vessel when seen from the side face, a side face 10 extending substantially vertically and a bottom face 11 extending slightly slantingly to the side face of the barrel. In the embodiment shown in the drawings, the recess 8 is formed at a position substantially intermediate between the conical shoulder 7 and the barrel 5 in the height direction. The side face 10 of the recess is formed to have a substantially arcuate shape so that the deepest part of the recess has a diameter (the distance from the axis) substantially equal to or larger than the diameter of the neck 4, when seen in the horizontal section.

Figure 5:
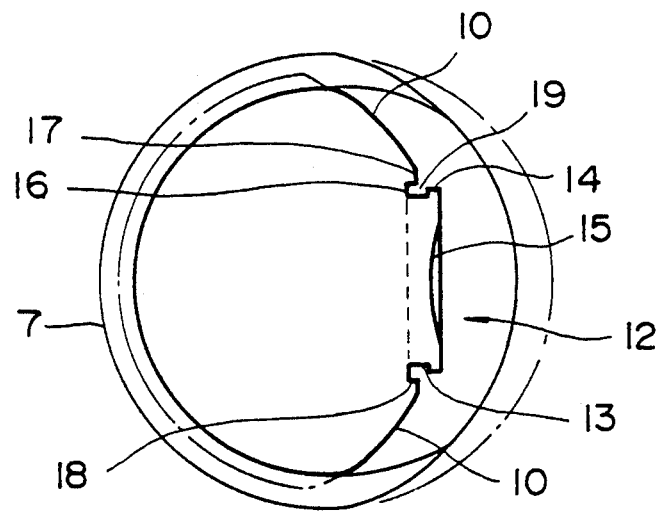
FIG. 5 is a view showing the section taken along line A—A in FIG. 3.
Figure 6:
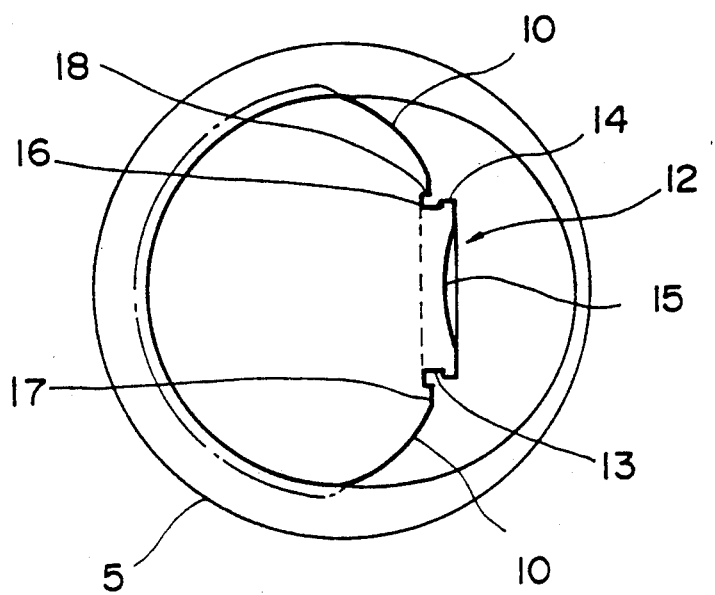
FIG. 6 is a view showing the section taken along line B—B in FIG. 3.

A projection represented as a whole by reference numeral 12 is formed substantially at the center of this recess 8. The projection 12 is formed so that the vertical section thereof has a non-circular shape. In the embodiment shown in the drawings, the vertical section of the projection has an oval shape. However, the shape of the vertical section of the projection 12 is not particularly critical, so far as rotation of the handle is prevented in the state where the projection 12 is combined with the handle described in detail hereinafter. For example, the vertical section of the projection 12 may have any of ellipsoidal, oblong, triangular, tetragonal, pentagonal and other polygonal shapes. This projection 12 is blow-formed or draw-blow-formed integrally with the recess 8 and other parts of the vessel proper, and the projection 12 comprises and outwardly extending small-space cylindrical portion 13, a flange portion 14 arranged at the top end of the cylindrical portion and having a size increasing in the transverse direction, and a top end face 15 closed at the flange portion. The projection 12 has a hollow structure. In the present embodiment, as shown in FIGS. 5 and 6, the top end face of the projection is concave so that a flange portion 14 expanding clearly and sufficiently in the transverse direction is formed at the time of formation of the projection 12.

A root face 16 of the projection 12 is formed at a position closer to the axis than a part 17 of the concave side face 10 having a smallest diameter (distance from the axis) through a step 18. Accordingly, it will be readily understood that a groove 19 is formed between the lower end of the cylindrical portion 13 of the projection 12 and the recess 8 for securing the handle more tightly.

Referring to FIGS. 7, 8 and 9 showing the handle of this vessel, this handle 2 comprises an endless holding portion 20 and an endless attachment portion 21, which are integrally prepared by injection forming of a synthetic resin. The holding portion 20 comprises a vertical portion 24 having nonskid convex parts 22 and concave parts 23 arranged alternately at small intervals, an upper curvature portion 25 and a lower curvature portion 26, and the holding portion 20 is connected to the attachment portion 21 through these curvature portions 25 and 26 to construct a ring as a whole as shown in FIG. 7. As shown in FIG. 8, in the attachment portion 21, also a ring is formed to locate in a plane substantially orthogonal to the plane including the attachment portion 21. The ring of the attachment portion 21 has a shape similar to that of the cylindrical portion 23 of the projection 12 of the vessel proper and an inner circumferential size substantially equal to the peripheral size of the cylindrical portion 13.

Referring to FIG. I illustrating the state where the vessel proper is combined with the handle, the projection 12 of the vessel proper 1 is inserted into the annular attachment portion 21 and the top end of the projection 12 is expanded to form a flange 14, whereby the annular attachment portion 21 is engaged with the flange 14 and fixation (fixation in the radial direction) of the handle 2 to the vessel proper 1 is accomplished. In the case where the groove 19 is formed in the root of the projection 12 and the annular attachment portion 21 is contained in this groove 19, fixation of the annular attachment portion 21 is effectively accomplished also in the direction orthogonal to the redial direction and shaking of the attachment portion is prevented. Moreover, since the projection 12 and attachment portion 21 have non-circular shapes, relative rotation between them is effectively prevented.

The synthetic resin vessel having a handle is prepared, for example, according to a process in which a handle is prepared in advance by injection forming, this handle is inserted into a blow mold and a preform for a vessel proper is prepared in the blow mold by blow forming or draw blow forming (insert blow forming process; corresponding to the first and third processes) or a process in which a preform for a vessel proper is subjected in a blow mold to blow forming or draw blow forming in advance to prepare a vessel proper, the vessel proper is inserted into an injection mold and a resin for a handle is subjected to injection forming (insert injection forming process; corresponding to the second process).

Figure 10:
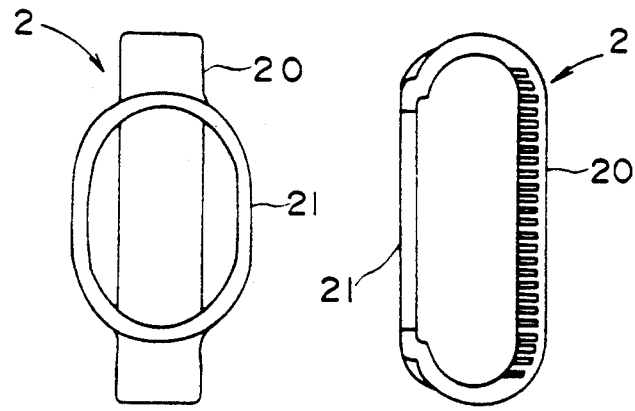
FIG. 10(A) illustrates the injection forming step.
FIG. 10(B) illustrates a stage of the blow-forming step.
FIG. 10(C) illustrates a later stage of the blow-forming step.
Figure 10:
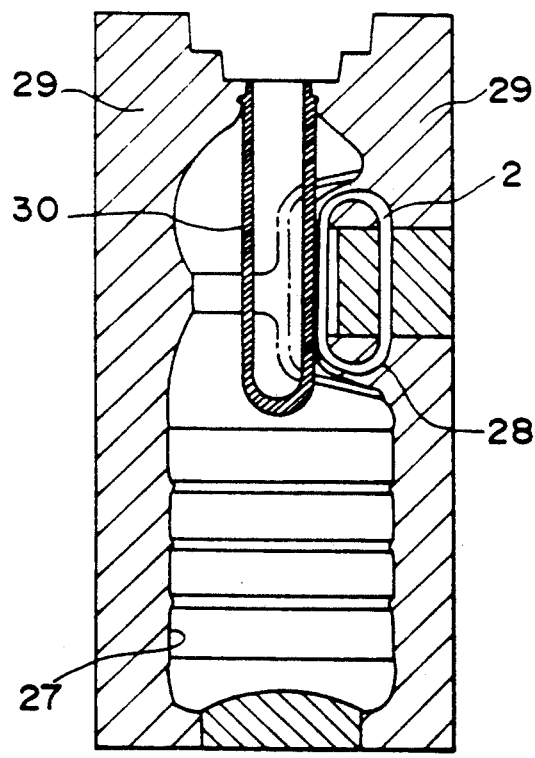
Figure 10:
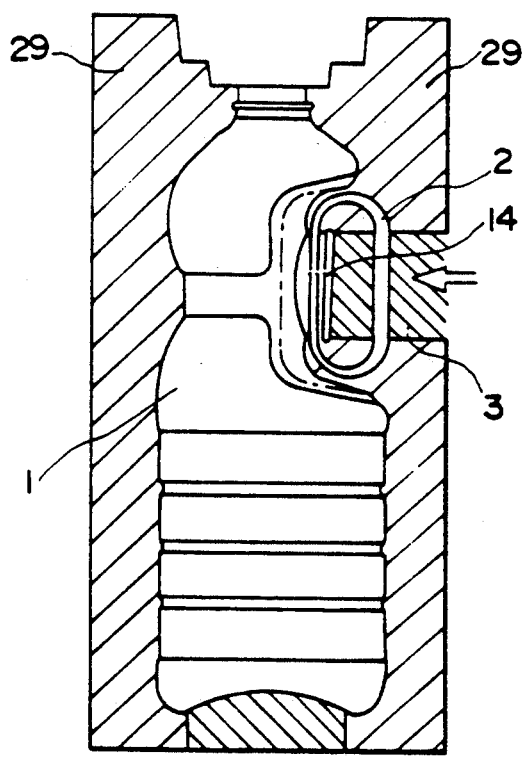

Referring to FIG. 10 illustrating the insert blow-forming process, at injection forming step (A), a handle 2 comprising a holding portion 20 and an attachment portion 21, which are endlessly integrated with each other, is formed by injection forming of a resin. Then, at former stage (B) of the blow-forming step, the handle 2 is inserted into a blow-forming split mold 29 having a blow-forming cavity 27 and an inserting cavity 28 and simultaneoulsy, a vessel proper-forming preform 30 maintained at the drawing temperature is held in the blow-forming cavity 27. In the state where the blow-forming split mold 29 is closed, a drawing rod (not shown) is pushed into the preform 30 to stretch and draw the preform 30 in the axial direction, and simultaneously, a high-pressure fluid is blown into the preform 30 to form the preform 30 into a vessel proper. At this stage, a projection 12 to be inserted into the attachment portion 21 of the handle 2 is formed, but a flanged portion 14 is not formed yet. Finally, at latter stage (C) of the blow-forming step, the top end of the projection 12 is pressed in the axial direction of the vessel by a pushing pin 31 slidably arranged in the blowing split mold 29 while the blow-forming pressure is still left, whereby a flange 14 is formed on the top end of the projection 12. Thus, a product comprising a vessel proper formed by draw-blow-forming and a handle formed by injection forming, which are tightly integrated with each other, is obtained. The blow mold 29 is opened, and the product is taken out.

Figure 3:
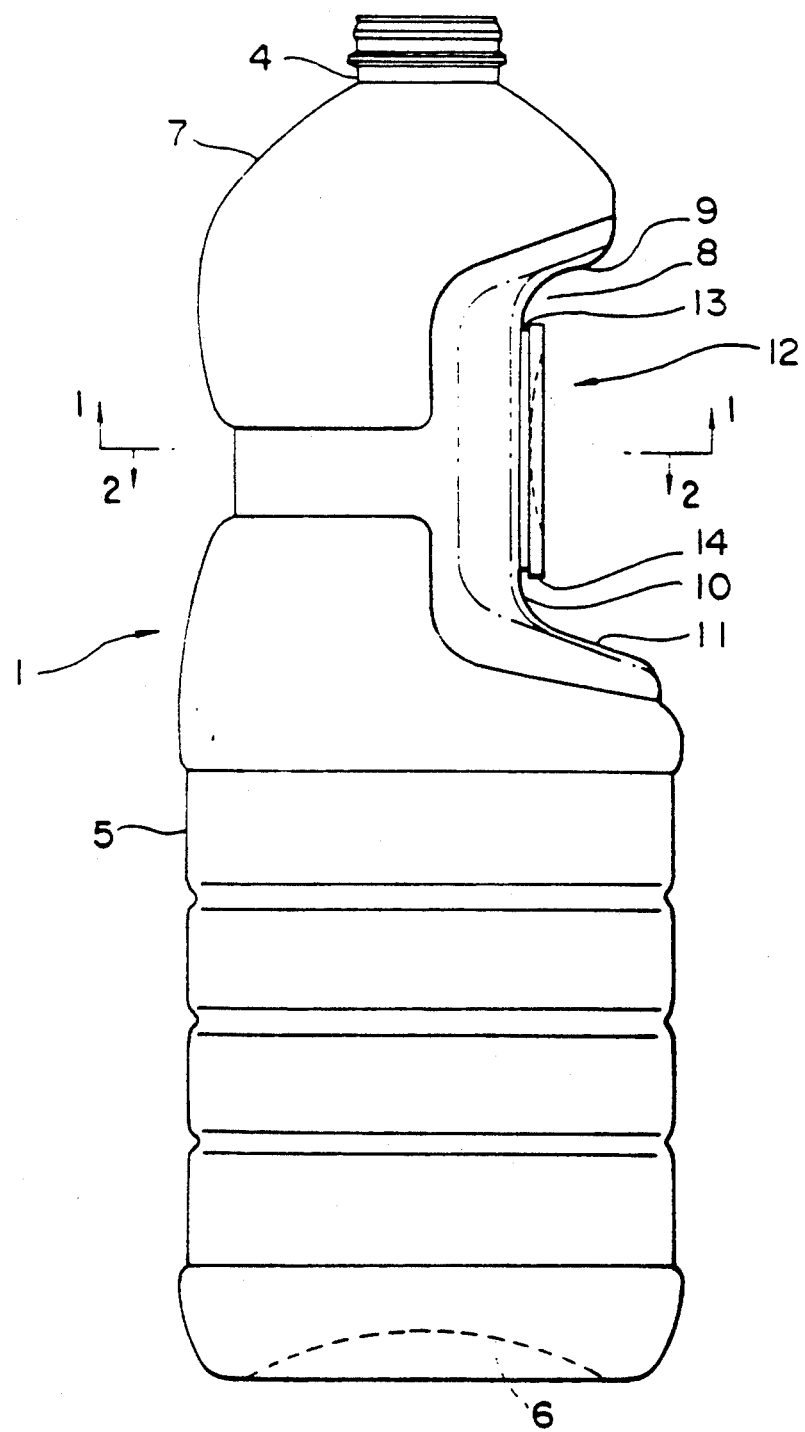
FIG. 3 is a side view illustrating only the vessel proper shown in FIG. 2.
Figure 4:
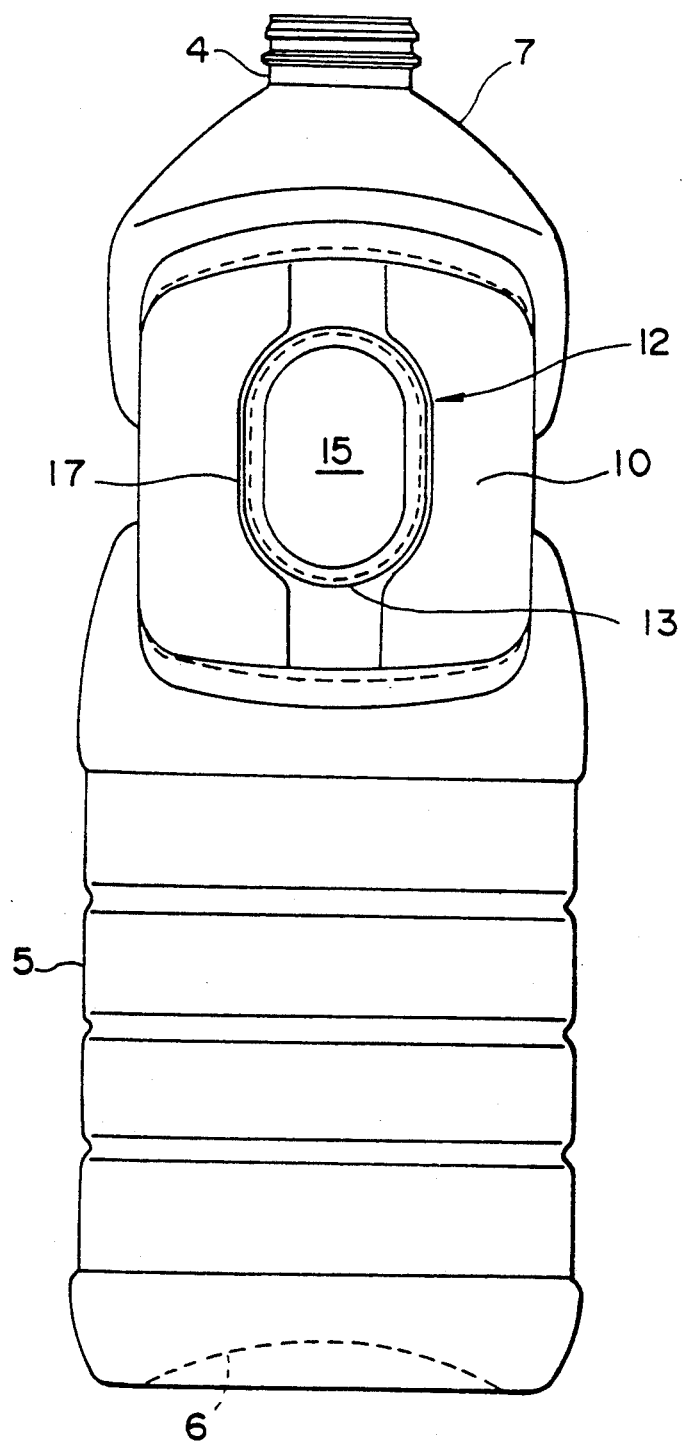
FIG. 4 is a side view illustrating the vessel proper of FIG. 2 in the state rotated by 90°.
Figure 11:
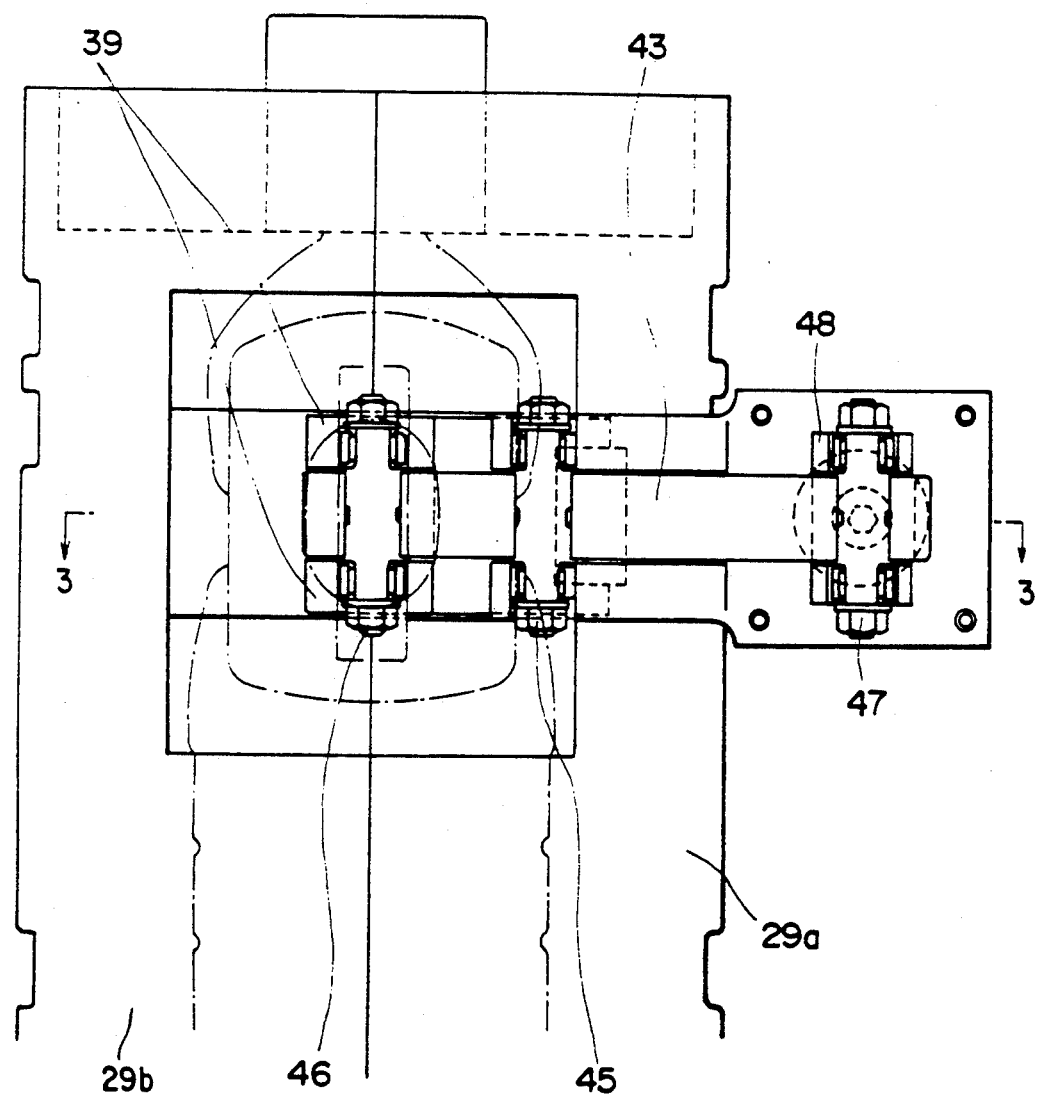
FIG. 11 is a side view illustrating an example of the pushing pin of the blow mold and its driving mechanism.
Figure 12:
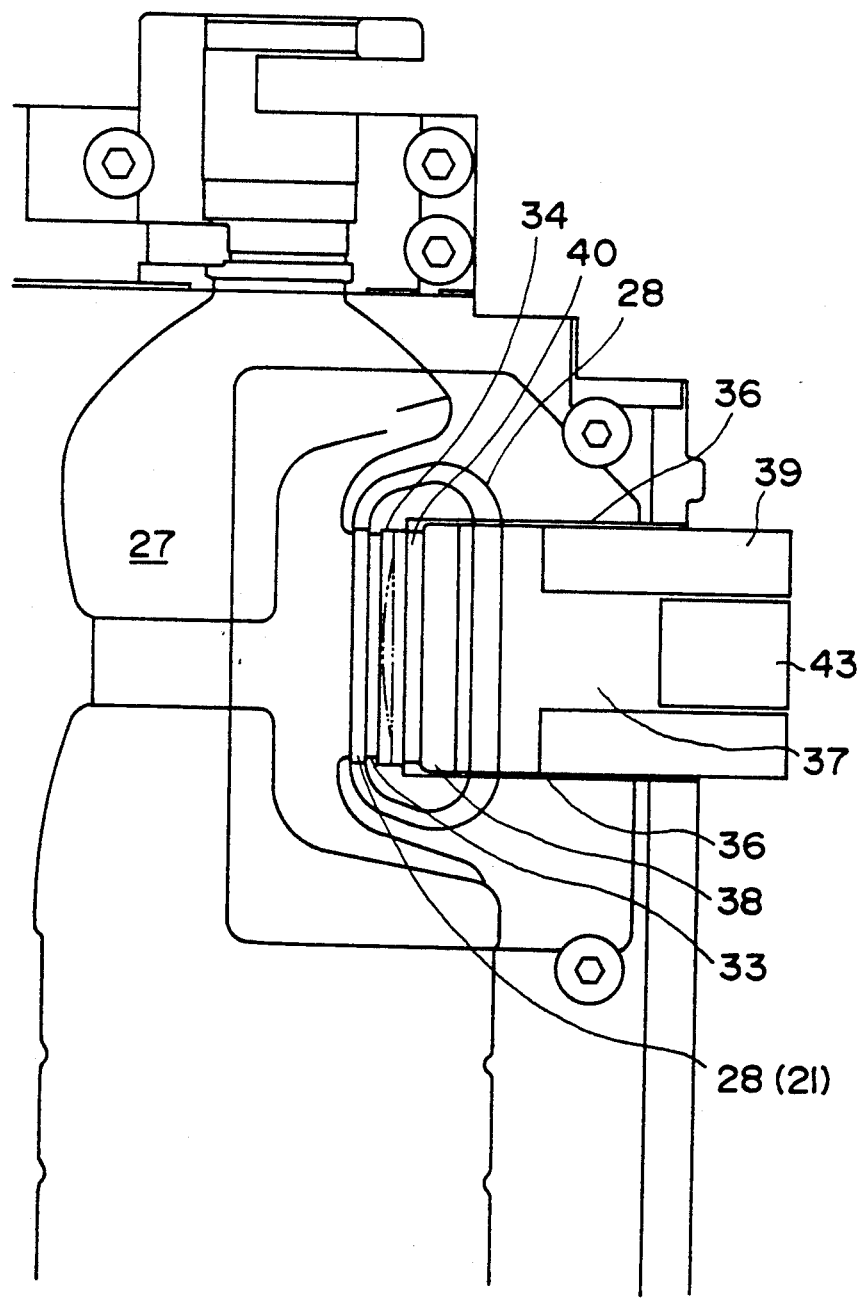
FIG. 12 is a view showing the section taken along line A—A in FIG. 11.
Figure 13:
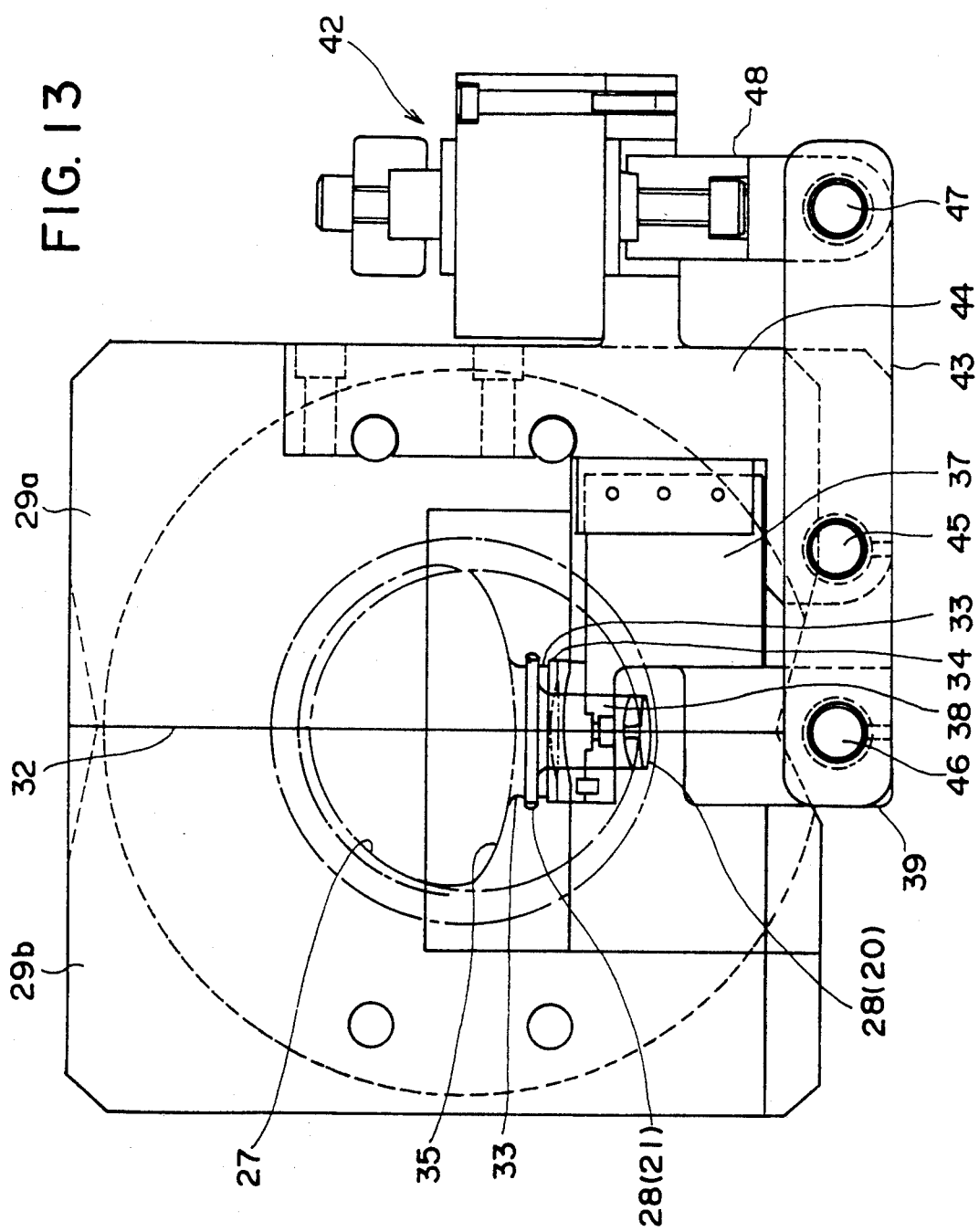
FIG. 13 is a view showing the section taken along line B—B in FIG. 11.

Referring to FIGS. 11 through 13, especially FIG. 13, illustrating the pushing pin of the blow mold and its driving mechanism together with the blow mold, a blowing split mold 29a, 29b is closed at a parting surface 32 so that the split mold 29a, 29b can be opened in the direction orthogonal to the parting surface 32. A handle cavity 28 is formed below the parting surface 32 and a blow-forming cavity 27 is formed substantially plane-symmetrically with the cavity 28 with respect to the parting surface 32. As shown in FIGS. 2 and 3, the holding portion 20 and attachment portion 21 of the handle 2 is held by the blow mold 29a, 29b in a positional relationship described below. Namely, a cylinder-forming cavity surface 33 having a small space is formed to extend through the inner circumference to both the sides, and a flange-forming cavity surface 34 is formed on this cavity surface 33 on the side of the holding portion and a recess-forming cavity surface 35 is formed on the opposite side. A horizontal notch 36 is formed in the direction of projection-forming cavities 33, 34 and 35 of the blow mold 29a, 29b, and a sliding member 37 slidable toward these cavities is formed in this notch. This sliding member 37 comprises a supporting arm 38 and a bracket 39, which are spaced from each other, and a pushing pin 40 is arranged in the supporting arm 38 on the cavity side. The pushing pin 40 has a shape similar to that of the flange-forming cavity surface 34, but the size of the periphery of the pushing pin 40 is slightly smaller than the size of the inner circumference of the cavity surface 34. The top end face of the pushing pin 40 is a convex face. The supporting arm 38 and pushing pin 40 are located between the holding portion 20 and attachment portion 21 supported by the blow mold 29a, 29b and the pushing pin 40 is located in contact with the flange-forming cavity surface 34 so that the cavity surface 34 is substantially closed by the pushing pin 40. The bracket 39 is located outwardly of the holding portion 20 and at least a part of the bracket 39 is located outwardly of the blow mold 29a, 29b.

A series of driving mechanisms, that is, an electromagnetic solenoid or fluid cylinder mechanism 42 and a link mechanism 43 for transmitting the reciprocative motion of the mechanism 42 to the pushing pin 40, are disposed to drive the pushing pin 40. More specifically, a frame 44 is secured to one split mold part 29a, and a link or lever 43 is arranged in this frame 44 so that the link or lever 43 can oscillate with a fulcrum 45 being as the center. One end of the link or lever 43 is connected to the bracket 39 through a pivot 46, and the other end is connected to a moving rod 48 of the reciprocating driving mechanism 42 through a pivot 47. When the reciprocating driving mechanism 42 is actuated, the link or lever 43 is turned and the sliding member 37 is caused to slide and the pushing pin 40 is pressed into the flange-forming cavity 34.

If draw-blow-forming of a preform (not shown) is carried out in the state shown in FIG. 13, a recess (10 FIG. 4) of a vessel proper is formed by the recess-forming cavity surface 35 by a fluid pressure, and a closed projection 12 is formed by the projection-forming cavity surfaces 33 and 34 and the outer surface 41 of the pushing pin 40. If the reciprocating driving mechanism 42 is operated in this state where the blow-forming pressure is applied to the formed hollow member, the pushing pin 40 is pressed into the projection 12, whereby a size-increased flange portion is formed.

Figure 14:
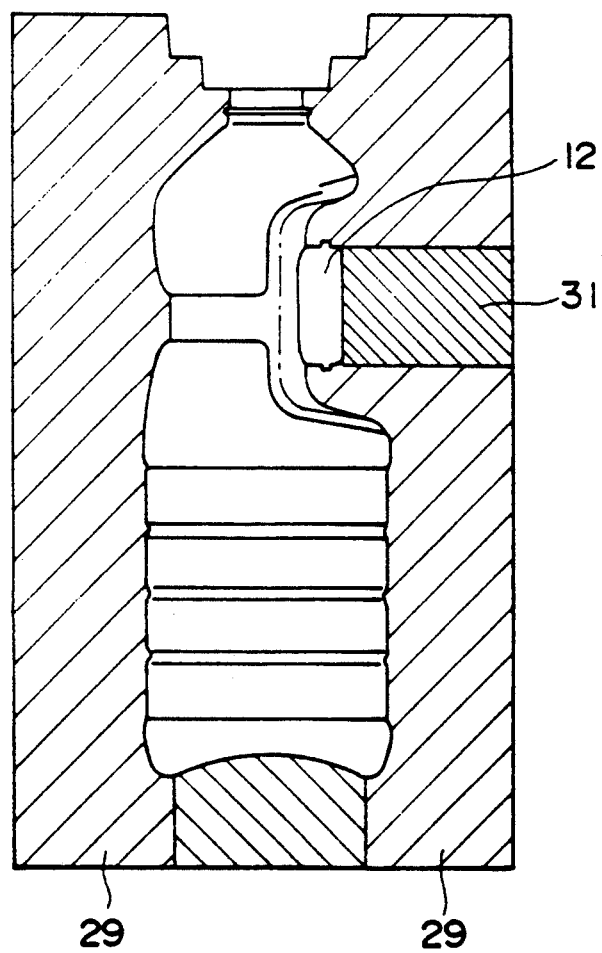
FIG. 14(A) illustrates an early stage of the blow-forming step.
FIG. 14(B) illustrates a later stage of the blow-forming step.
FIG. 14(C) illustrates the injection step.
Figure 14:
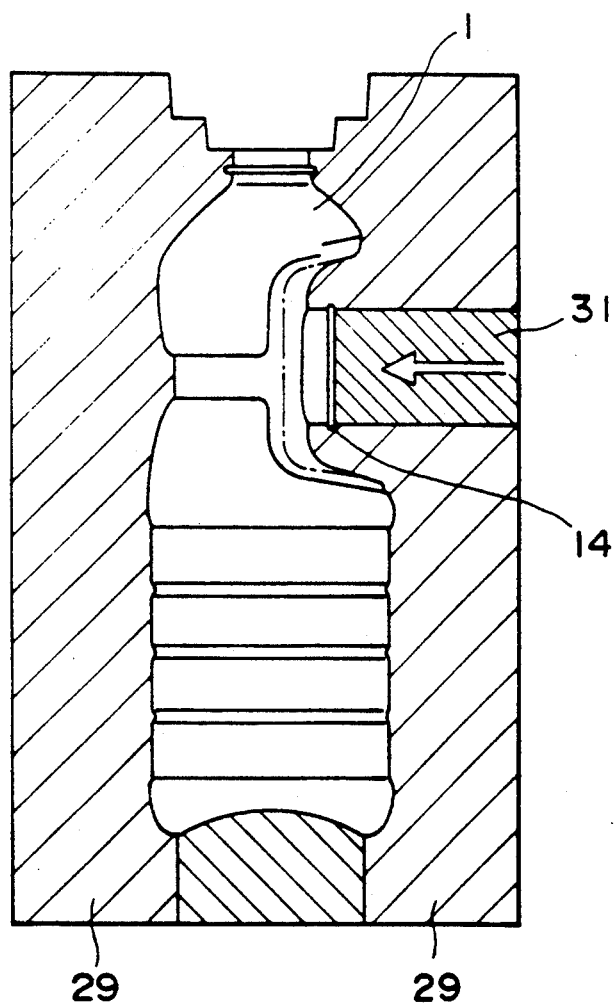
Figure 14:
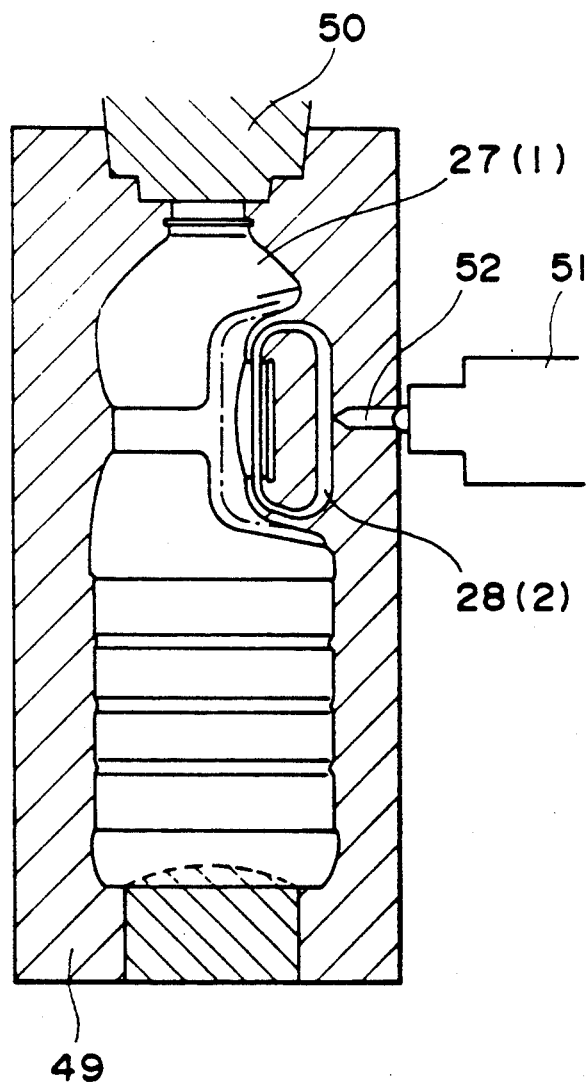

Referring to FIG. 14 illustrating the insert injection forming process, at former stage (A) of the blow-forming step, a preform is draw-blow-formed in the blowing split mold 29 to obtain a hollow member, in the same manner as step (B) in FIG. 10. At this stage, no flange is still formed on the projection 12. At latter stage (B) of the blow-forming step, the pushing pin 31 is pressed in the state where the blowing pressure is imposed in the hollow member, whereby the top end portion of the projection 12 is expanded to form a flange 14. Then, the blowing split mold 29 is opened and the formed vessel proper 1 is taken out.

Then, at injection step (C), in an injection mold 49 having a cavity 27 for a vessel proper and a cavity 28 for a handle, the vessel proper 1 is inserted into the cavity 27 and the mold is clamped. A nozzle 50 is attached to the vessel proper 1, and a fluid pressure is applied into the vessel proper so that deformation of the vessel proper by the injection pressure is prevented. An injecting machine 51 is connected to the injection mold 49 and a resin for a handle is injected into the cavity 28 through a gate 52 to form a handle integrated with the vessel proper 1. The formation of the projection 12 of the vessel proper 1 can be performed by using the same mechanism as shown in FIGS. 11 through 13 except that the handle-forming cavity is omitted.

Figure 15:
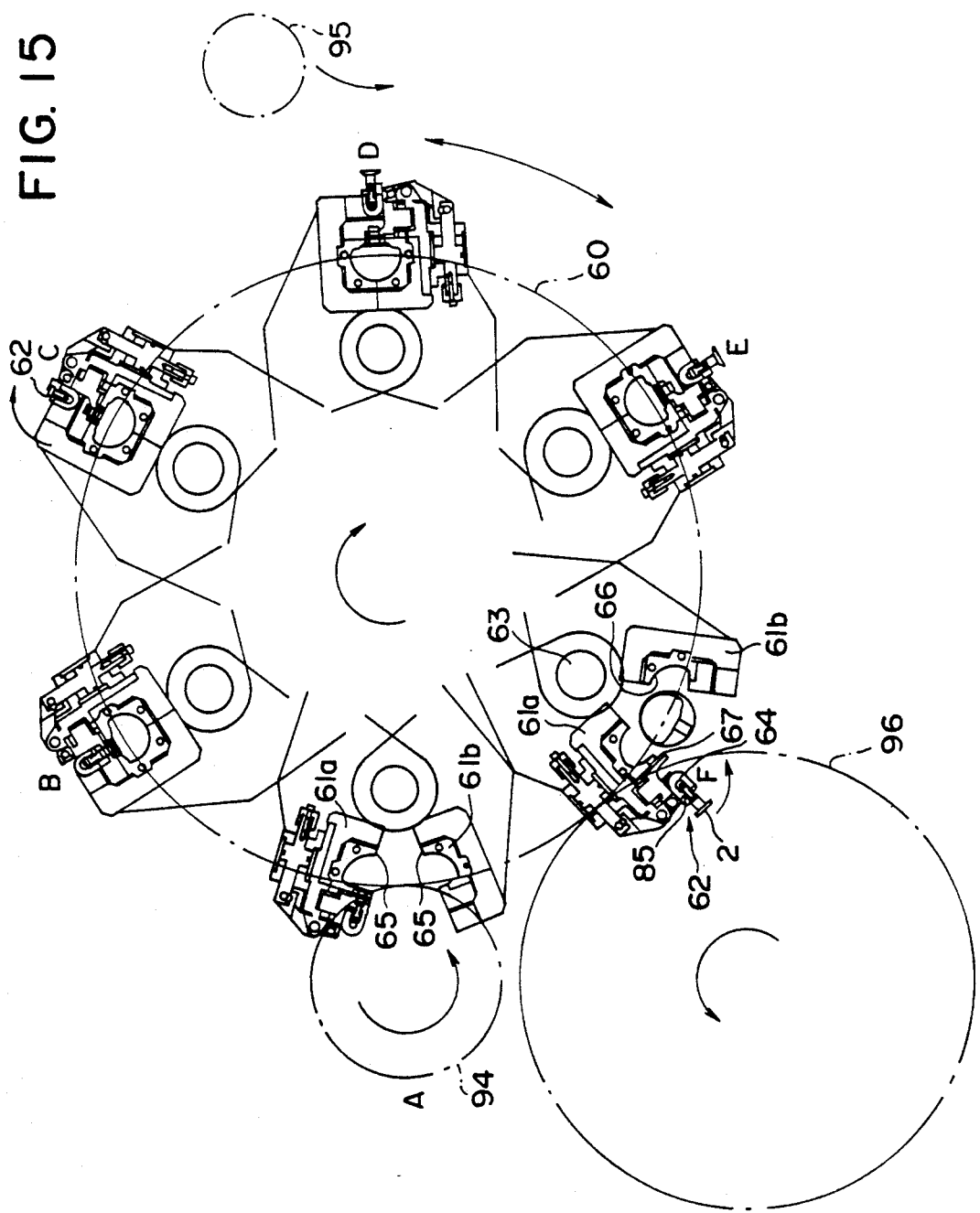
FIG. 15 is a top view showing the entire arrangement of the insert blow-forming apparatus of the present invention.

Referring to FIG. 15 illustrating the entire arrangement of an embodiment of the preparation apparatus used for working the third process of the present invention, a rotary member 60 is arranged rotatably in the clockwise direction in the drawings. A plurality of pairs of split molds 61a, 61b, and handle-holding members 62 are arranged circumferentially in the rotary member 60. The split mold 61a, 61b is pivoted on the rotary member 60 through a shaft 63 so that the split mold 61a, 61b can be opened and closed. The handle-holding member 62 is arranged rotatably to one split mold part 61a through a shaft 64.

The split mold 61a, 61b, has a parting surface 65 and the split mold 61a, 61b can be opened and closed through this parting surface 65. The split mold has a handle-inserting cavity 66 and a cavity 67, which are arranged plane-symmetrically with respect to the parting surface 65. This handle-inserting cavity 6C is arranged, for example, the the following manner so that the handle 2 can be secured to the vessel proper 1.

Figure 16:
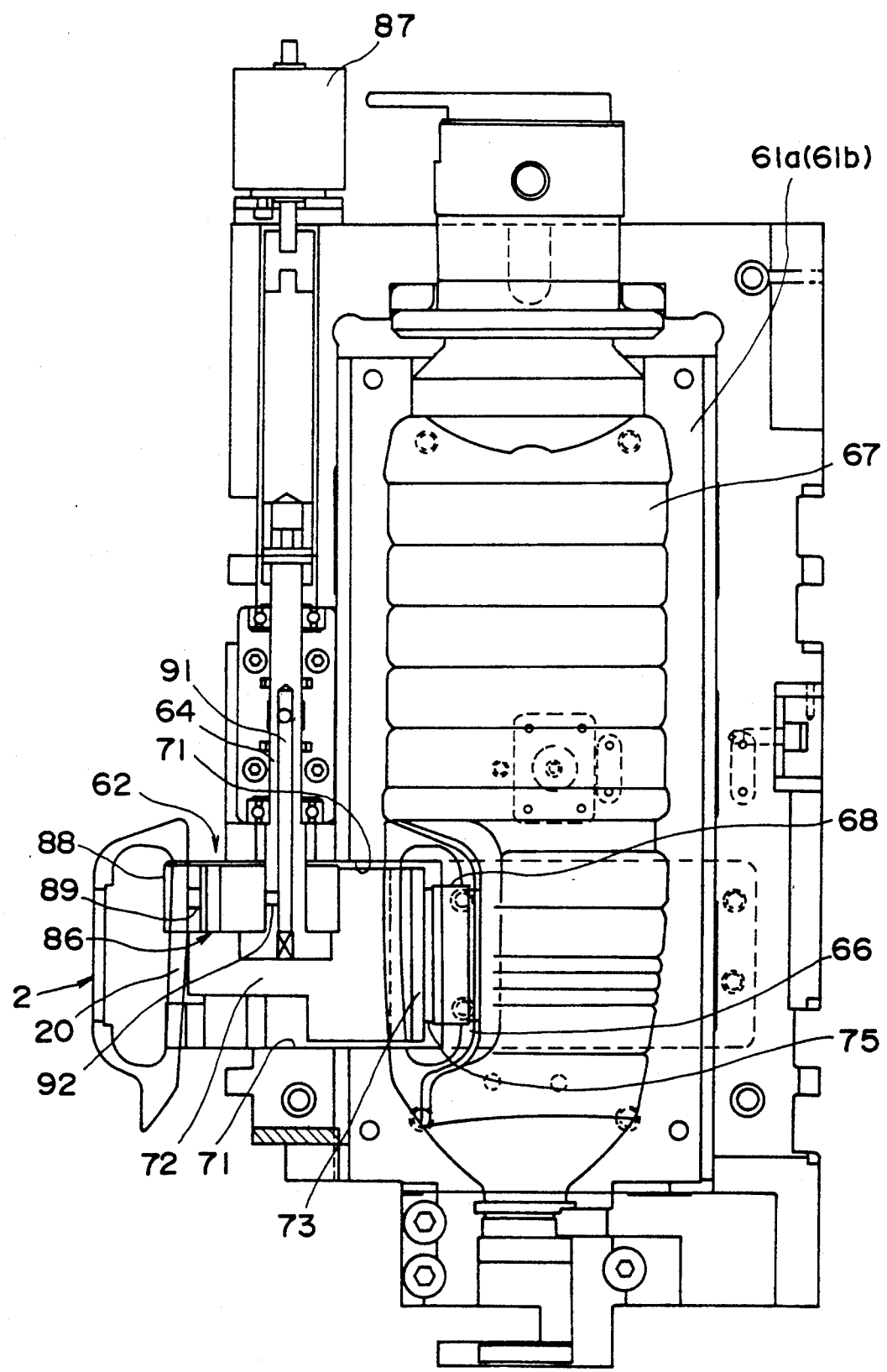
FIG. 16 is a partially sectional side view showing the blow mold and handle-holding member.
Figure 17:
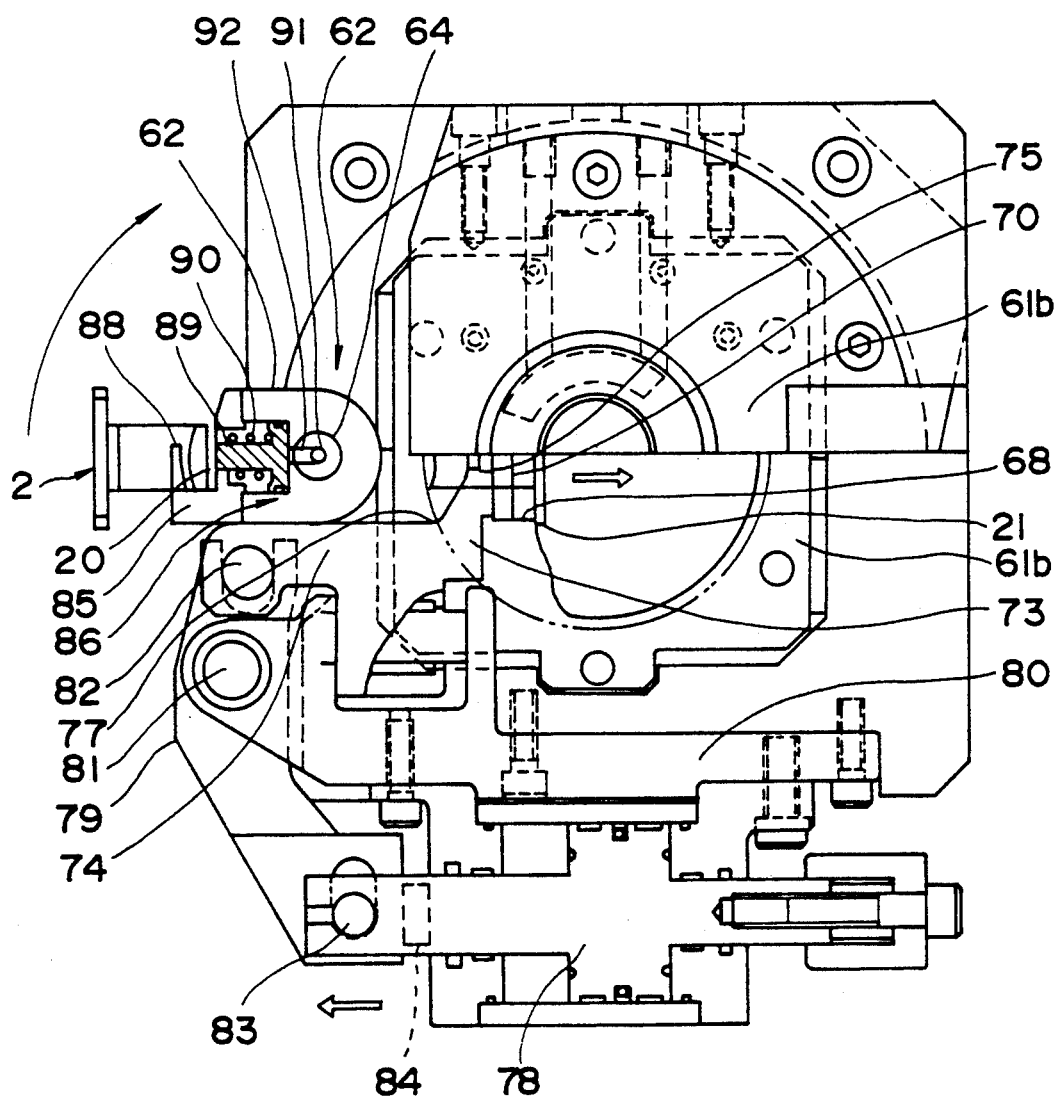
FIG. 17 is a top view of the apparatus shown in FIG. 16.

As shown in FIGS. 16 and 17, the holding portion 20 and attachment portion 21 of the handle 2 are held by the blow mold 61a, 61b, in a positional relationship described below. Namely, a small-space cylinder-forming cavity surface 68 is formed to extend through the inner circumference of the annular attachment portion 21 toward both the sides thereof, and a recess-forming cavity surface 70 is formed on the grip side of this cavity surface 68.

A horizontal notch 71 is formed to extend toward the projection-forming cavities 68 and 70 of the blow mold 61a, 61b. A sliding member 72 is arranged in the notch 71 slidably toward these cavities. The sliding member 72 has a supporting arm 73 and a bracket 74, which are arranged separately from each other, and a pushing pin 75 is arranged on the supporting arm 73 on the cavity side. The pushing pin 75 has a shape similar to the flange-forming cavity surface 69 but the peripheral size of the pushing pin 75 is slightly smaller than the inner size of the cavity surface 69, and the top end face of the pushing pin 75 is a convex face. The supporting arm 73 has a notch 77 inhibiting engagement with the holding portion 20 of the handling and is located between the cavity 66 for containing the attachment portion 21 of the handle and the holding portion 20 of the handle. The pushing pin 75 is contiguous with the flange-forming cavity surface 70 so that the cavity surface 70 is substantially closed. The bracket 74 is located outwardly of the holding portion 20 of the handle and at least a part of the bracket 74 is located outwardly of the blow mold 61a, 61b.

AEseries of driving mechanisms, that is, an electromagnetic solenoid or fluid cylinder mechanism 78 and a link mechanism 79 for transmitting a reciprocating motion of the mechanism 78 to the pushing pin 75, are arranged to drive the pushing pin 75. More specifically, a frame 80 is secured to the other split mold part 61b, and a link or lever 79 is swingably attached to the frame 80 through a fulcrum 75. The bracket 74 is connected to one end of the link or lever 79 through a pivot 82, and the other end of the link or lever 79 is connected to a piston rod 84 of the reciprocating driving mechanism 78 through a pivot 83. Accordingly, when the reciprocating driving mechanism 78 is operated, the link or lever 79 is turned and the sliding member 72 is caused to slide, and the pushing pin 75 is thrust into the flange-forming cavity 70.

Roughly speaking, the handle-holding member 62 comprises a handle-holding portion 85, an opening-closing mechanism 86 for opening and closing the handle-holding portion 85 and a driving mechanism 87 for rotating the handle-holding portion 85. Referring to FIGS. 16 and 17 illustrating these mechanism in detail, the handle-holding portion 85 has a hook-shaped top end 88 and a piston 8. capable of moving toward this top end 88. The piston 89 is always urged by a spring 90 so that the piston 89 retreats from the top end 88, and the piston 89 is connected to a fluid pressure source (not shown) through a passage 91 extending vertically along the center of the rotation shaft 64 and a horizontal passage 92 so that when a fluid pressure is applied, the piston is advanced toward the hook-shaped top end 88 to hold the holding portion of the handle and when the fluid pressure is released, the piston 89 is retreated to release the holding portion 20 of the handle. Of course, a space for insertion of the holding portion 20 of the handle is formed between the hook-shaped top end 88 and the piston 89, and this space is opened in the turning direction of the handle-holding member 62. A rotary driving mechanism 87 utilizing a fluid pressure is connected to the other end of the rotation shaft 64.

Accordingly, the handle-holding member 62 can be turned and reversely turned between the handle-receiving position on the left side of FIG. 15 and the handle-inserting position on the right side of FIG. 15, and it will be readily understood that the handle can be held and released by the driving of the piston 89.

Figure 18:
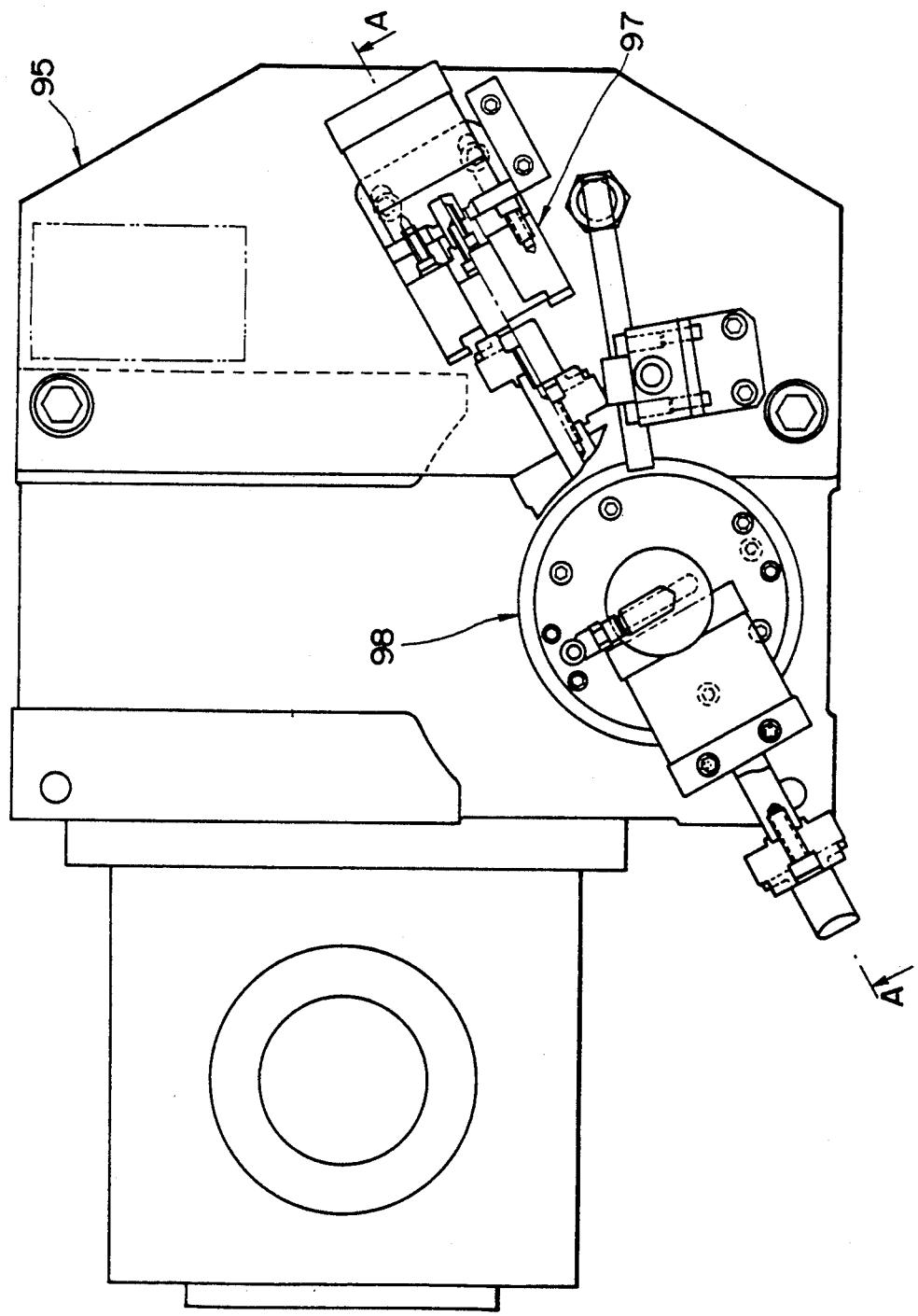
FIG. 18 is a top view illustrating the handle supply mechanism.
Figure 19:
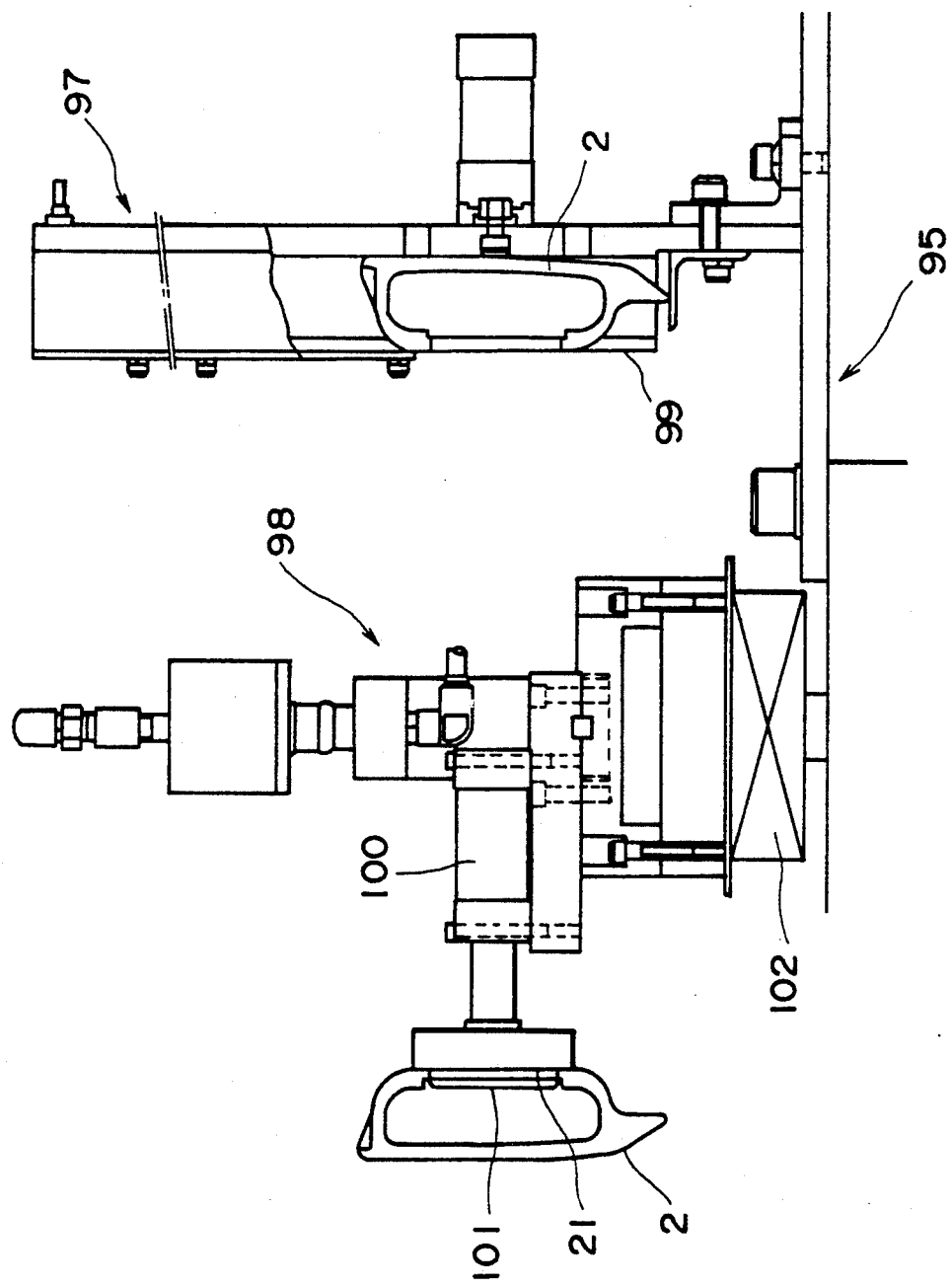
FIG. 19 is a partially sectional side view of the apparatus shown in FIG. 18.
Figure 20:
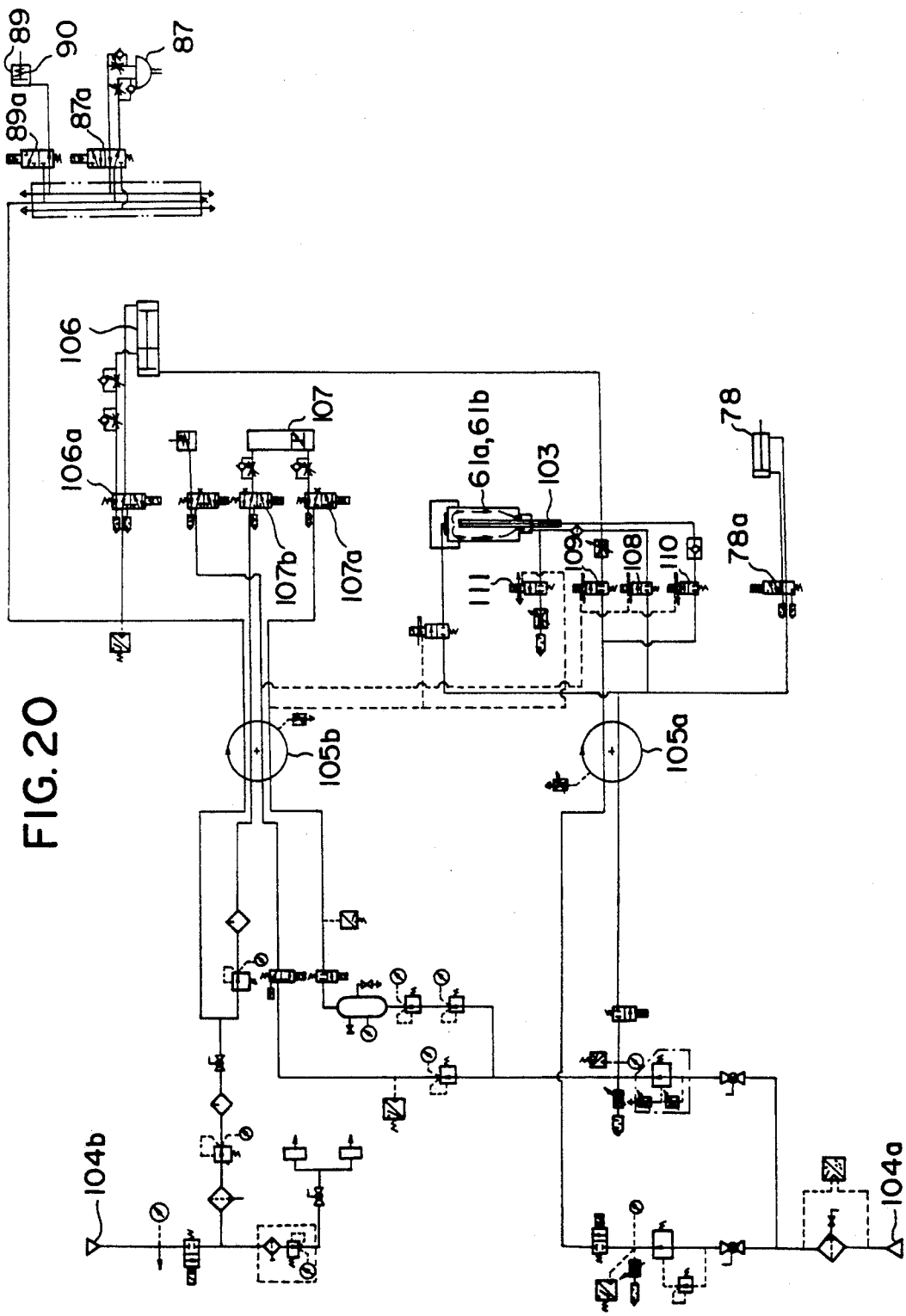
FIG. 20 is a diagram showing the control system for respective members.

Referring to FIG. 15 again, the shown rotary member has six split molds and six handle-holding members, and a parison supply zone A, a handle supply zone D and a handle-secured vessel discharge zone F are arranged around the rotary member 60. A parison supply mechanism 94, a handle supply mechanism 95 and a handle-secured vessel discharge mechanism 96 are arranged in each of these zones. Known mechanisms are used as the parison supply mechanism 94 and handle-secured vessel discharge mechanism 96. Referring to FIGS. 18 and 19 illustrating the handle supply mechanism 95 in detail, this handle supply mechanism 95 comprises a stacker 97 for containing the handle and a manipulator 98 for taking out the handle contained in the stacker 97 and shifting it to the handle supply position. Handles 2 are piled in a row and stored in this state, and a window 99 for taking out the handle 2 is formed at a lower part of the front face of the stacker 97. The manipulator 98 comprises a cylinder 100 actuated by a fluid pressure and a pick-up pad 101 attached to the top end of the cylinder 100. If this pad 101 is inserted into the annular attachment portion 21 of the handle 2, the handle 2 is held. A rotary driving mechanism or swinging mechanism 102 rotated between the handle attachment position and handle supply position of the stacker 97 is mounted on the manipulator 98.

According to the present invention, as shown in the step diagram of FIG. 1, the operation of closing the split mold 61a, 61b after the passage through the parison supply zone and opening the split mold 61a, 61b before the arrival at the handle-secured vessel discharge zone F and the operation of rotating the handle-holding portion 85 in the state where the split mold 61a, 61b is opened, so that the handle 2 is inserted into the handle-inserting cavity 66 of one split mold part 61a, then opening the handle-holding portion 85, turning reversely the handle-holding portion 85 to the handle-receiving position before the arrival at the handle supply zone D, closing the handle-holding portion 85 after the receipt of the handle 2 in the handle supply zone, blowing a fluid into the parison in the state where the split mold 61a, 61b is closed, and accomplishing the blow-forming or draw-blow-forming of the parison to a vessel and the fixation of the handle to the vessel are conducted in FIG. 15.

In an embodiment of the control mechanism for the foregoing operations, shown in FIG. 15, the driving and control of the respective members are performed by utilizing a fluid pressure. AT first, the split mold 61a, 61b is in the opened state and a drawing rod 103 is in the dropped state. The handle-holding member 62 is at the position for receiving the handle and kept on standby, and the handle 2 is held on the handle-holding portion 85 (see FIG. 15F).

In this state, a fluid pressure is applied to a handle-holding member-rotating mechanism 87 through a changeover 87a connected to a pressure source 104b through a rotary joint 105 to rotate the handle-holding member 62 and move it to the inserting position in the split mold, and the handle 2 is thus inserted into the cavity 66. Then, a valve 89a is actuated and the fluid pressure applied to the piston 89 is released, the piston 89 is retreated by the spring 90 to release the handle 2 (see FIG. 15A).

In this state, the parison is supplied into the split mold 61a, 61b by the parison supply mechanism, and a changeover valve 106a connected to the pressure source 104b through the rotary joint 105b is changed over the mold opening-closing mechanism 106 is driven to clamp the split mold 101a, 101b (see FIG. 15B). After the clamping of the mold, valves 107a and 107b are changed over and the drawing rod 103 is raised by the cylinder 107 to stretch-draw the parison in the axial direction. Simultaneously, a valve 108 is opened and a fluid pressure is applied to the interior of the parison to expansion-draw the parison in the circumferential direction. Before the stretch drawing by the drawing rod 103, the parison can be preblown by opening a valve 109 (see FIGS. 15B, 15C, 15D and 15E).

After the split mold has arrived at the position B shown in FIG. 15, the valve 87a is changed over, whereby the handle-holding member-driving mechanism 87 turns the handle-holding member 62 reversely to the handle-receiving and standby position outside the mold, shown in FIG. 15. When the rotary member 60 arrives at the position D shown in FIG. 15, the manipulator 98 of the handle supply mechanism 95 shown in FIGS. 18 and 19 rotates counterclockwise, whereby the holding portion 20 of the handle 2 held by the manipulator 98 is inserted into the holding portion 85 of the handle-holding member 62. Simultaneously, the valve 89a is opened to advance the piston 89 and hold the handle 2, and the handle-hold standby state is continued to the zone F shown in FIG. 15.

The blow split mold 61a, 61b is closed over the region of from the zone B to the zone E in FIG. 15. During this region, blow-forming or draw-blow-forming, fixation of the handle to the vessel and cooling for withdrawing the vessel from the mold are carried out. For fixing the handle to the vessel, a valve 78a is opened just after blow-forming or draw-blow-forming, and the flange-forming cylinder 78 is advanced, whereby the pushing pin 75 is thrust into the projecting portion of the handle through the attachment ring 21 to form a flange 14 and effect fixation of the handle. Then, valves 110 and 111 are opened and a cold gas is blown into the vessel to effect cooling for withdrawal.

Finally, before the rotary member 60 reaches the zone F, the valves 107a and 107b are changed over, and the clamping mechanism 107 is reversely driven to open the split mold. The formed vessel 1 having a handle is discharged to the vessel discharge mechanism 96, and then, the foregoing operations are similarly repeated.

In the present invention, the changeover operation of opening and closing the respective valves can be carried out in such a manner that electromagnetic valves are used as the respective valves and they are opened and closed through limit switches mounted on the rotary member. Alternatively, the valves can be controlled by a computer according to a predetermined time schedule. Of course, there can be adopted a method in which cams and the like are used instead of electromagnetic valves and the changeover operation of opening and closing the valves is mechanically effected.

Blow-formable resins, especially thermoplastic resins molecularly orientable by drawing, can be optionally used as the resin constituting the vessel proper. For example, there can be mentioned thermoplastic polyesters such as polyethylene terephthalate (PET) and polybutylene terephthalate, polycarbonates, acrylic monomer/butadiene/styrene copolymers (ABS resins), polyacetal resins, nylons such as nylon 6, nylon 6,6 and copolymer nylons thereof, acrylic resins such as polymethyl methacrylate, isotactic polypropylene, and polystyrene. The handle-forming resin may be the same as or different from the resin for the vessel proper. As resins other than those exemplified above, there can be mentioned low-density polyethylene, medium-density polyethylene, high-density polyethylene, an ethylene/propylene copolymer, an ethylene/butene-1 copolymer and a styrene/butadiene thermoplastic elastomer. Of course, various additives such as a colorant and a filler can be incorporated into the handle-forming resin.

In the present invention, blow-forming or draw-blow-forming of a preform for blowing can be carried out according to customary procedures except the above-mentioned characteristic features. For example, a parison for blowing can be obtained by injecting a resin as mentioned above into an injection mold and cooling the injected resin in a super-cooled state (amorphous state). For blow-forming of this parison, there can be adopted a method comprising pre-heating the preform at a drawing temperature, stretch-drawing the parison in the axial direction in a blow mold and simultaneously, expand-drawing the parison in the circumferential direction. In case of PET, the drawing temperature is generally in the range of from 80° to 130° C.

For injection of the handle-forming resin, a temperature of 180° to 280° C., especially 220° to 260° C., is preferably adopted, though the temperature differs to some extent according to the kind of resin. The injection pressure for the handle-forming resin is preferably 15 to 45 kg/cm² (gauge), especially preferably 20 to 30 kg/cm² (gauge). In order to prevent deformation of the vessel by the resin injection pressure, a compressed gas is introduced into the vessel at the time of injection of the handle-forming resin. It is preferred that this applied pressure be higher than the resin injection pressure and be in the range of from 20 to 45 kg/cm² (gauge), especially 25 to 35 kg/cm² (gauge). Preferably, the surface of the injecting mold is cooled to about 5° to about 20° C.

The foregoing description is directed to one embodiment, but the present invention is by no means limited by this embodiment. For example, instead of the draw-blow-forming method, there can be adopted the blow-forming method (blow-melting method) in which the forming operation is much easier, as is obvious to those skilled in the art.

We claim:

1. An apparatus for the preparation of a vessel having a handle, which comprises:
    an injection mold having a cavity for forming a handle having an endless holding portion and an endless attachment portion;
    an injection molding mechanism for injecting a resin for the handle into the cavity of the injection mold;
    a blow-forming or draw-blow-forming split mold having a parting surface that can be closed, cavity assembly which is arranged in the split mold plane-symmetrically with the parting surface and includes an inserting cavity for containing the handle therein, and a forming cavity which has a neck-forming cavity, a barrel-forming cavity, a closed bottom-forming cavity, a recess-forming cavity formed at a part of the barrel-forming cavity so that the diameter of a deepest part of the recess-forming cavity is substantially equal to or slightly larger than the diameter of the neck-forming cavity, a projection-forming cavity for forming a projection formed to project and extend through the attachment portion almost to the center of the recess-forming cavity, and a flange-forming cavity formed on the top end of the projection-forming cavity to have a section expanded over the projection-forming cavity;
    a mechanism for supplying a blowing pressure into a preform held by the split mold to effect blow-forming or draw-blow-forming of the preform;
    a pushing pin that can be pressed into the flange-forming cavity; and
    a pushing pin-driving mechanism for pressing the pushing pin in the state where the blowing pressure is still applied to a hollow member formed in the split mold, whereby a flange is formed on the top end of the projection.

* * * * *